US011586564B2

(12) United States Patent
Wu et al.

(10) Patent No.: US 11,586,564 B2
(45) Date of Patent: Feb. 21, 2023

(54) HEAD OF LINE ENTRY PROCESSING IN A BUFFER MEMORY DEVICE

(71) Applicant: Samsung Electronics Co., Ltd., Gyeonggi-do (KR)

(72) Inventors: Chun-Chu Chen-Jhy Archie Wu, San Carlos, CA (US); Fnu Vikram Singh, Fremont, CA (US); Syed Kaiser, San Ramon, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/315,191

(22) Filed: May 7, 2021

(65) Prior Publication Data

US 2022/0164300 A1 May 26, 2022

Related U.S. Application Data

(60) Provisional application No. 63/118,480, filed on Nov. 25, 2020.

(51) Int. Cl.
*G06F 13/16* (2006.01)
*G06F 12/02* (2006.01)

(52) U.S. Cl.
CPC ...... *G06F 13/1673* (2013.01); *G06F 12/0238* (2013.01); *G06F 13/1626* (2013.01); *G06F 13/1663* (2013.01)

(58) Field of Classification Search
None
See application file for complete search history.

(56) References Cited

U.S. PATENT DOCUMENTS

| | | | |
|---|---|---|---|
| 9,672,165 B1 | 6/2017 | Satish et al. | |
| 9,875,182 B1 | 1/2018 | Wallace et al. | |
| 2004/0133749 A1* | 7/2004 | Yang | G06F 12/0817 711/E12.027 |
| 2007/0094450 A1* | 4/2007 | VanderWiel | G06F 12/128 711/122 |
| 2013/0151777 A1* | 6/2013 | Daly | G06F 12/0897 711/E12.024 |
| 2020/0065244 A1 | 2/2020 | Sanghi et al. | |
| 2020/0073586 A1 | 3/2020 | Kurata et al. | |

* cited by examiner

*Primary Examiner* — Charles J Choi
(74) *Attorney, Agent, or Firm* — The Farrell Law Firm, P.C.

(57) ABSTRACT

A method of a buffer memory device, a storage system, and a buffer memory device are provided. The method of the buffer memory device, the buffer memory device having a lower tier memory and a higher tier memory, may include receiving a new entry request, determining that the new entry request includes an HOL entry, selecting an entry on the higher tier memory to be tiered down to the lower tier memory in response to determining that the new entry request includes an HOL entry, removing the selected entry from the higher tier memory, storing the HOL entry in the higher tier memory of the buffer memory device, and outputting the HOL entry to an arbiter.

20 Claims, 12 Drawing Sheets

HEAD OF LINE ENTRY PROCESSING IN A BUFFER MEMORY DEVICE

PRIORITY

This application is based on and claims priority under 35 U.S.C. § 119(e) to U.S. Provisional Patent Application Ser. No. 63/118,480, filed on Nov. 25, 2020, the entire contents of which are incorporated herein by reference.

TECHNICAL AREA

The present disclosure is generally related to memory devices having data buffers that process head of line (HOL) entries.

BACKGROUND

In a buffer memory device having a multiple-source multiple-destination queue, the device receives and processes entry requests. If there is insufficient storage when an HOL request is received, the HOL request may be blocked.

SUMMARY

According to one embodiment, a method of a buffer memory device having a lower tier memory and a higher tier memory includes receiving a new entry request, determining that the new entry request includes an HOL entry, selecting an entry on the higher tier memory to be tiered down to the lower tier memory in response to determining that the new entry request includes an HOL entry, removing the selected entry from the higher tier memory, storing the HOL entry in the higher tier memory of the buffer memory device, and outputting the HOL entry to an arbiter.

According to one embodiment, a storage system includes a memory including a higher tier memory and a lower tier memory and a processor configured to receive a new entry request, determine that the new entry request includes an HOL entry, select an entry on the higher tier memory to be tiered down to the lower tier memory in response to determining that the new entry request includes an HOL entry, remove the selected entry from the higher tier memory, store the HOL entry in the higher tier memory, and output the HOL entry to an arbiter.

According to one embodiment, a buffer memory device includes a higher tier memory, a lower tier memory, and an arbiter. The memory device receives a new entry request, determines that the new entry request includes an HOL entry, selects an entry on the higher tier memory to be tiered down to the lower tier memory in response to determining that the new entry request includes an HOL entry, removes the selected entry from the higher tier memory, stores the HOL entry in the higher tier memory, and outputs the HOL entry to the arbiter.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
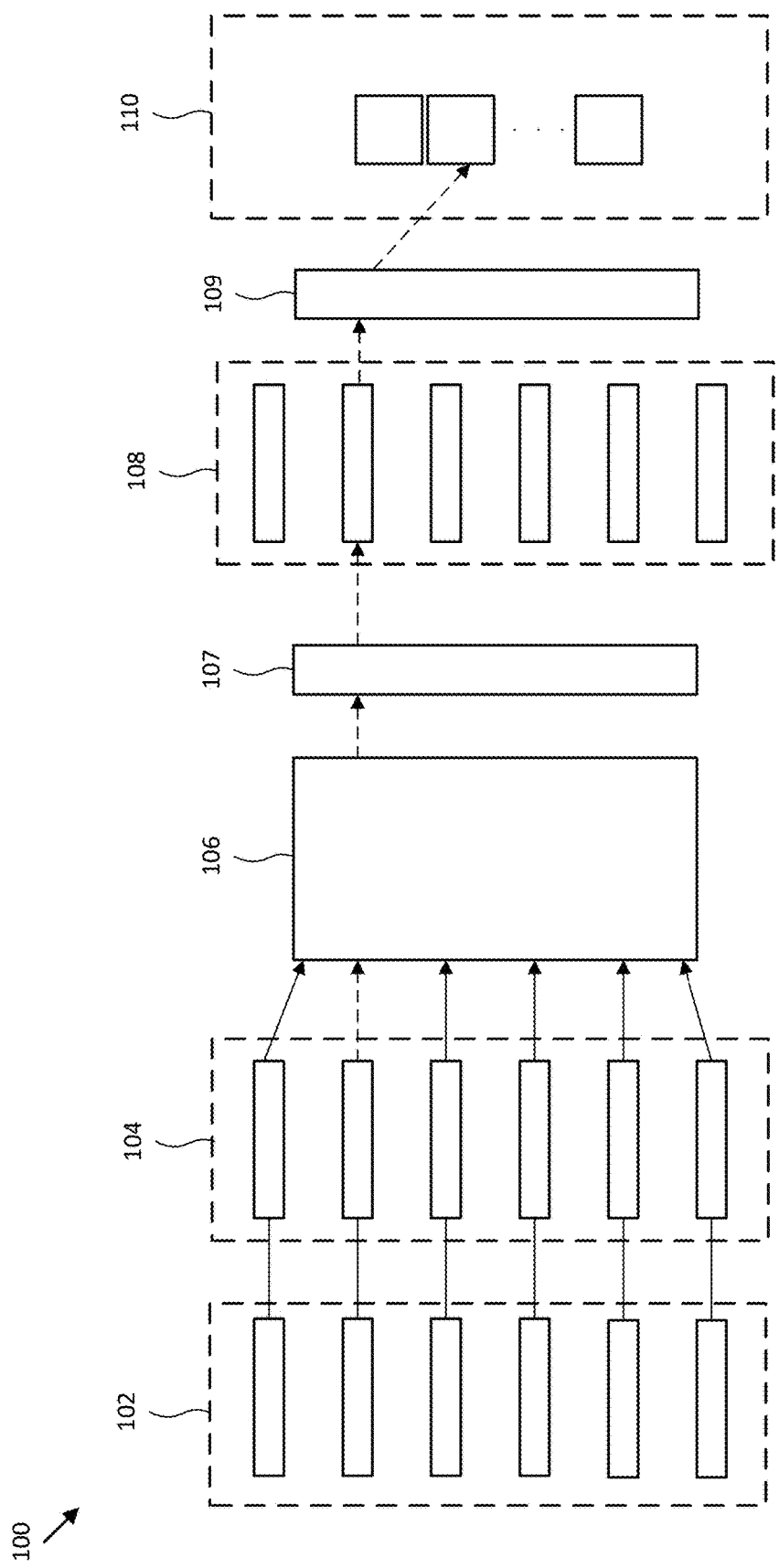
FIG. 1 illustrates a block diagram of a buffer memory device having a queue share structure, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure provides memory devices, systems and methods for data buffers that allow for processing of HOL entries. When a new queue enters a multi-queue system with an HOL entry to be stored in an already full higher tier (e.g., tier 1) storage, the memory system may move tail of line (TOL) entries from the higher tier to a lower tier (e.g., tier 2) to create space. Entry allocation may be performed on demand rather than being based on a reservation scheme. An amount of higher tier storage may be overprovisioned to mitigate tier-down latency. The overprovisioned portion may be utilized to store HOL entries. Furthermore, the memory system may utilize dual residency of a TOL entry on the higher tier memory by copying the TOL entry on the higher tier memory to a lower tier memory.

The present disclosure provides high throughput and low latency when there is a change in data traffic patterns. It is scalable, and the higher tier storage may be fully utilized, while reducing the higher tier storage size and cost.

FIG. 1 illustrates a block diagram of a buffer memory device 100 having a queue share structure, according to an embodiment. The memory device 100 includes data sources 102, input queues 104 that correspond to the data sources 102, a source arbiter 106, and a shared memory structure 107 that splits the queue structure to a source-destination pair, destination queues 108, a destination arbiter 109 and destinations 110 that correspond to the destination queues 108. The number of sources, queues and destinations may vary according to the structure of the memory device 100. The source arbiter 106 receives entry requests from the input queues 104. When an entry request is HOL (e.g., a new stream of traffic from one source to one destination that was not presented in the destination queues 108 (e.g., the request illustrated by the dashed arrow)), the source arbiter 106 may prioritize the HOL entry request such that the HOL entry is stored and then output to the destination arbiter 109. However, if there is insufficient storage on the memory device 100, HOL will have to be stored in the slower memory, which reduces the throughput.

To improve latency and throughput as well as to be able to store large number of entries, the shared memory 107 may include a higher tier, faster memory, and a lower tier, slower memory. The higher tier, faster memory may include a static random access memory (SRAM), and the lower tier, slower memory may include a dynamic RAM (DRAM), although implementations are not limited to the use of SRAM and DRAM. Other high tier memory to low tier memory components may be utilized without departing from the scope of the disclosure. The memory device 100 may keep HOL entries of queues (e.g., source queues, source and destination queue pairs, destination queues, etc.) in a higher tier faster memory to solve the latency and throughput issues.

The memory device 100 may push a new HOL entry of any queue to the higher tier memory (the HOL entry may be the queue request with "zero length"). If the higher tier storage is full, the memory device 100 may perform a tier down operation on the occupied middle entries and TOL, making space in the higher tier storage. When performing the tier down request, the memory device may identify a highest utilized queue in the higher tier storage and move entries to the lower tier storage. After space is made in the higher tier storage, the HOL of the new queue is pushed to the higher tier storage, and non-HOL entries are stored in the lower tier storage. Non-zero length queues may be stored in the lower tier storage. The memory device may also overprovision the higher tier memory for storing the HOL entries (e.g., instead of 100% utilization of the SRAM, some space is saved for HOL entries). When entries are tiered down, the HOL entries stored in the overprovisioned section of the higher tier memory are moved/transitioned to a non-overprovisioned portion of the higher tier memory or a new portion (e.g., at least part of the space freed up by the tier down operation) of the higher tier memory is assigned as an overprovisioned portion. Additionally, the memory device 100 may include an overprovision pointer that points to a free memory space of the memory device 100. When the memory device 100 receives a new HOL entry, the memory device 100 may store the HOL entry in the free memory space pointed to by the overprovision pointer. The memory device 100 may then allocate a new overprovisioned portion and update the overprovision pointer to point to the new overprovisioned portion. If there is no space available for a new overprovisioned portion, the memory device 100 may tier-down an entry to a lower tier memory and the update the overprovision pointer to point to the free memory space created by the tier-down operation. If there are no new HOL to fill the higher tier memory, the memory device will allow middle entries and TOL to be stored in higher tier memory to improve memory utilization, and reduce entry movement and power consumption by the tier up operation. In response to queue entries stored in the higher tier memory draining from a queue (and freeing space in the higher tier memory), entries from other queues (e.g., middle entries and the TOL) stored in the lower tier memory will be moved to the higher tier memory. A link-list may be utilized to link entries together. Thus, each entry may include a link indicator that indicates in which order/position the entry is to be processed and/or the next entry that is to be processed. The link indicator may also include a pointer that identifies where on the memory device 100 where the next entry to be processed is located. When a TOL entry is moved from the higher tier memory to a lower tier memory, the link indicator, including the pointer, of the new, last entry on the higher tier memory may be updated to link to and point to the new, first entry on the lower tier memory. In an example where more than one entry is tiered down, multiple pointers of the link indicators may be updated. For example, for a queue that has entries [0, 1, 2, 3, 4, 5, 6] with [0, 1, 2, 3] in top tier and [4, 5, 6] in the next tier, and entries 2 and 3 are to be tiered down, the memory device 100 may update the pointer of entry 1 to point to the new location of entry 2 and update the pointer of entry 2 to point to the new location of entry 3.

Figure 2:
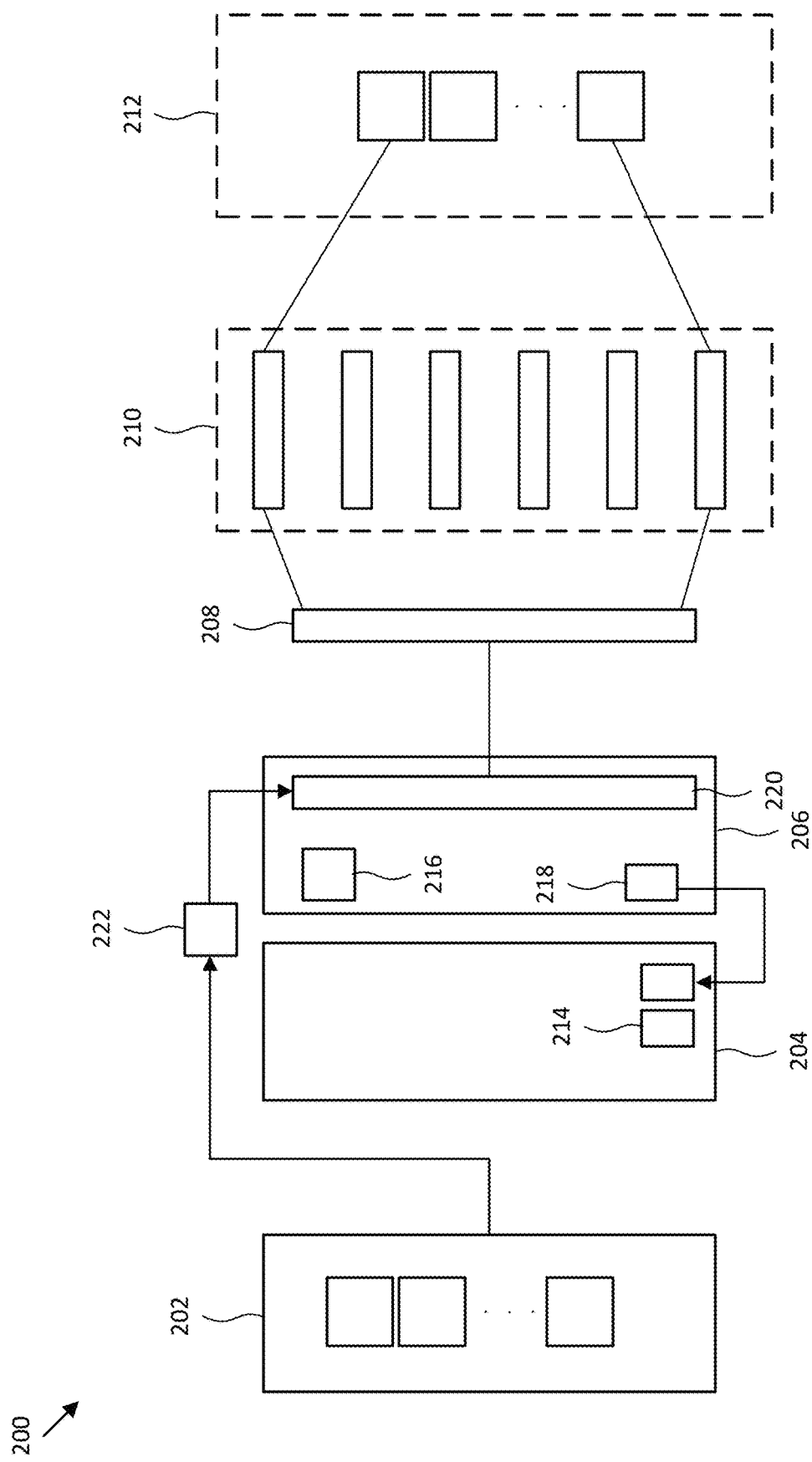
FIG. 2 illustrates a block diagram of a memory system, according to an embodiment.

FIG. 2 illustrates a block diagram of a memory system 200, according to an embodiment. The memory system 200 includes a source 202 that may include source queues, a lower tier memory 204, a higher tier memory 206, an arbiter 208, destination queues 210, and destinations 212. Different queues stored in the lower tier memory 204 and the higher tier memory 206 may be associated with different sources, and the memory system 200 may include an arbiter for the source queues. The destination queues 210 may be stored on the higher tier memory 206, the lower tier memory 204 and/or an external device/component that stores queues. The lower tier memory 204 may have stored on it entries, such as entry 214. The higher tier memory 206 may have stored on it entries, such as entry 216 and 218. The higher tier memory 206 may include an overprovisioned portion 220. The overprovisioned portion 220 may be allocated prior to receiving any entry requests. The overprovisioned portion 220 is set aside to receive a new HOL entry. The size of the overprovisioned portion 220 may correspond to a size of an entry. The overprovisioned portion 220 may be static, such that an HOL entry placed in the overprovisioned portion 220, the tier down process occurs if necessary, and the HOL entry is moved/transitioned from the overprovisioned portion 220 to a non-overprovisioned portion (i.e., regular portion) of the higher tier memory 206. The overprovisioned portion 220 may be dynamic, such that an HOL entry is received, the tier down process occurs if necessary, and a new portion of the higher tier memory 206 (e.g., the portion freed by the tier down process) is designated as a new overprovisioned portion. The overprovisioned portion 220 may then be designated as a regular portion of the higher tier memory 206. For example, if the tier down process copies entry 224 to the lower tier memory 204, the portion freed in the higher tier memory 206 by removing entry 224 from the higher tier memory 206 may become the new overprovisioned portion. In examples that use an overprovision pointer, the overprovision pointer may no longer reference the space occupied by the overprovisioned portion 220.

When a new entry 222 is received, the memory system 200 may determine the entry 222 is an HOL entry (e.g., a first entry for a new or empty queue). If the entry 222 is not an HOL entry, the memory system 200 identifies to which queue the entry 222 corresponds and proceeds normally to add the entry 222 to the TOL of that queue either in the higher tier or lower tier memory. If the entry 222 is an HOL entry, the memory system 200 may determine whether there is sufficient space on the higher tier memory 206 to store the entry 222. If there is insufficient space to store the entry 222, the memory system 200 then identifies a portion of the higher tier memory 206 that can be moved to the lower tier memory 204 to create space in the higher tier memory 206 to store the entry 222 as the HOL entry of a new queue. As shown in FIG. 2, in one example, the memory system 200 stores the entry 222 on the overprovisioned portion 220. Then, the memory system 200 identifies and selects an entry 218 (or a portion of an entry) in the higher tier memory 206 to move to the lower tier memory 204. The memory system 200 may identify the entry 218 by selecting a queue having the most entries in the higher tier memory 206 (e.g., a longest queue) and identifying a last portion (e.g., a last N entries, where N is an integer) of the queue within the higher tier memory 206. The entry 222 may then be moved/transitioned from the overprovisioned portion 220 to the non-overprovisioned portion (e.g., regular storage) of the higher tier memory 206. The entry 222 may be stored simultaneously in the current overprovisioned portion 220, and the source arbiter 208 may output the entry 222 to the corresponding destination without latency. Furthermore, when the entry 222 is stored in the overprovisioned portion 220, an arbiter (not shown) may receive a new entry from the source 202 (or other source) to store into the lower tier memory 204 and/or the higher tier memory 206 without waiting for the tier down process to complete. The overprovisioned portion 220 may be about 5% of the size of the higher tier memory 206.

A link-list may be utilized to link entries together. Thus, each entry may include a link indicator that indicates in which order/position the entry is to be processed, as well as which entry is to be processed next. The link indicator may include a pointer that points to a location of the memory device where the next entry to be processed is stored. In the example shown in FIG. 2, entry 216 may include a link indicator that indicates the entry is to be processed first and/or that entry 218 is to be processed next as well as a pointer to the location of entry 218, entry 218 may include a link indicator that indicates the entry is to be processed after entry 216 and/or that entry 214 is to be processed next as well as a pointer to the location of entry 214, and entry 214 may include a link indicator that indicates the entry is to be processed after entry 218. Thus, when entry 218 is copied to the lower tier memory 204, the link-list may be updated such that entry 218 is re-linked (i.e., a pointer is updated) to indicate that entry 218 is to be processed on the lower tier memory 204.

Figure 3:
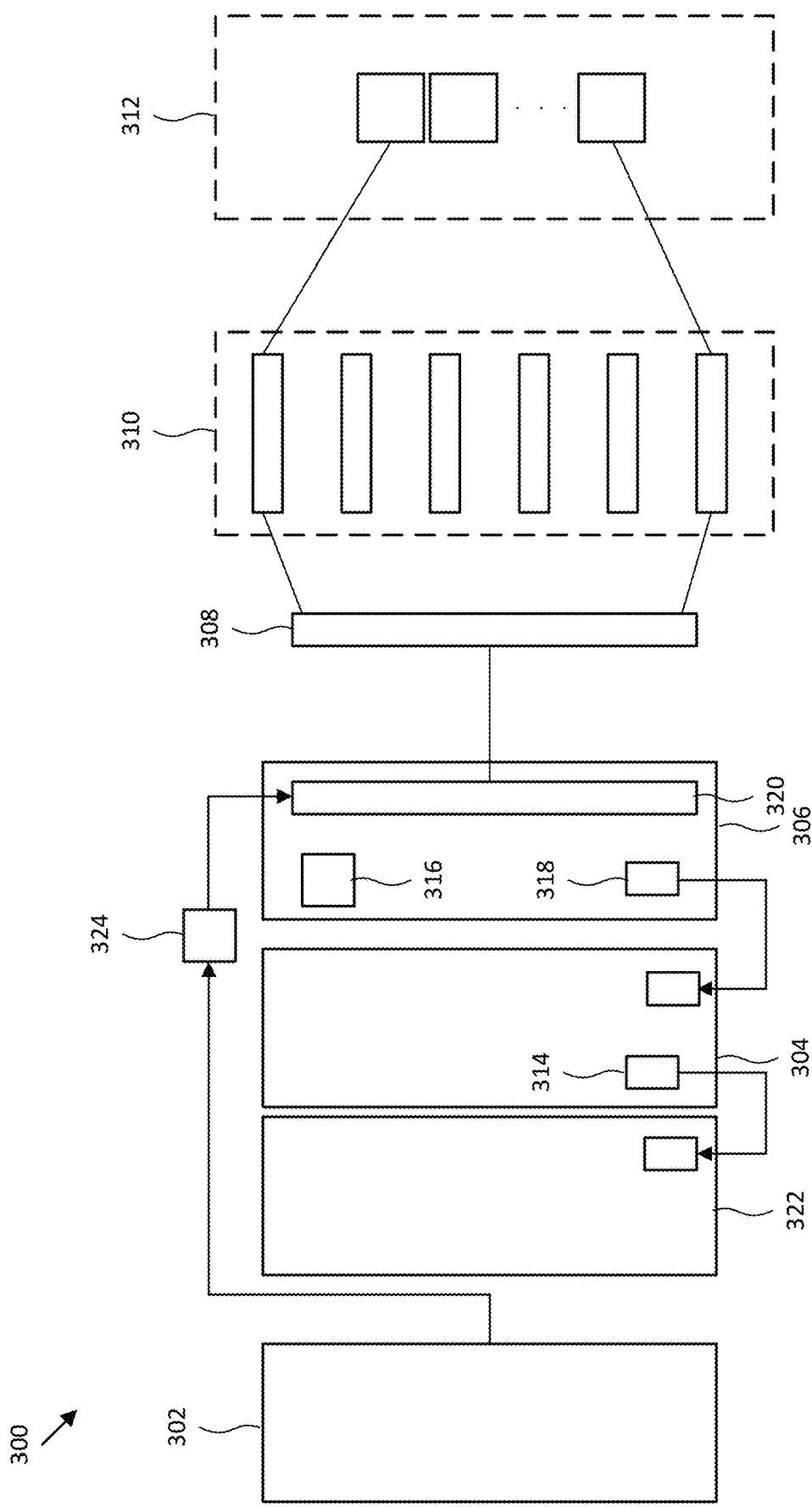
FIG. 3 illustrates a block diagram of a memory system, according to an embodiment.

FIG. 3 illustrates a block diagram of a memory system 300, according to an embodiment. The memory system 300 includes a source 302, a lower tier memory 304, a higher tier memory 306, an arbiter 308, destination queues 310, and destinations 312. The lower tier memory 304 may have stored on it entries, such as entry 314. The higher tier memory 306 may have stored on it entries, such as entry 316 and 318. The higher tier memory 306 may include an overprovisioned portion 320. The memory system 300 may include a third memory 322, such as a flash memory. When an entry 324 is received, the memory system 300 may identify an entry 318 to move to the lower tier memory 304 and then identify an entry 314 to move the third memory 322. In this example, the higher tier memory 306 is the tier 1 storage, the lower tier memory 304 is the tier 2 storage and the third memory (e.g., a memory that is slower than the higher tier memory 306 and the lower tier memory 304) is the tier 3, lowest tier storage.

In some embodiments, the higher tier memory may include a dual residency portion. The traffic request for the HOL entry may be stored in the dual residency area. The data to be tiered down is duplicated in advance to the lower tier memory. The amount of space of the dual residency area may be fixed. The dual residency area may also include a margin buffer to provide a dynamic amount of duel residency area in the lower tier memory. The margin buffer may include various predetermined thresholds. For example, the margin buffer may include a low watermark threshold that indicates when more dual residency area is needed for storing HOL entries. The margin buffer may also include a high watermark threshold that indicates when use of the higher tier memory can be stopped.

Figure 4A:
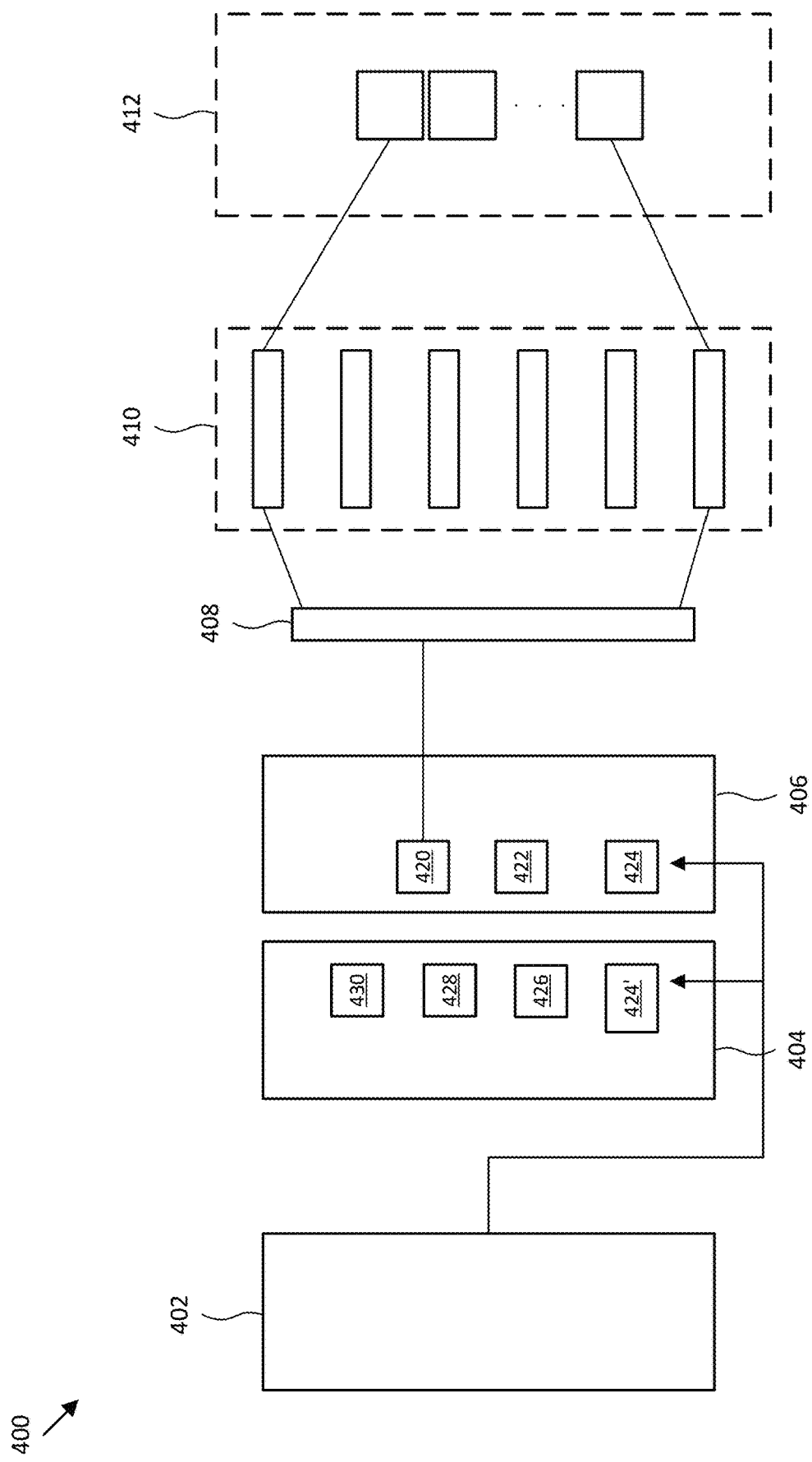
FIGS. 4A, 4B, and 4C illustrate a block diagram of a memory system, according to an embodiment.
Figure 4B:
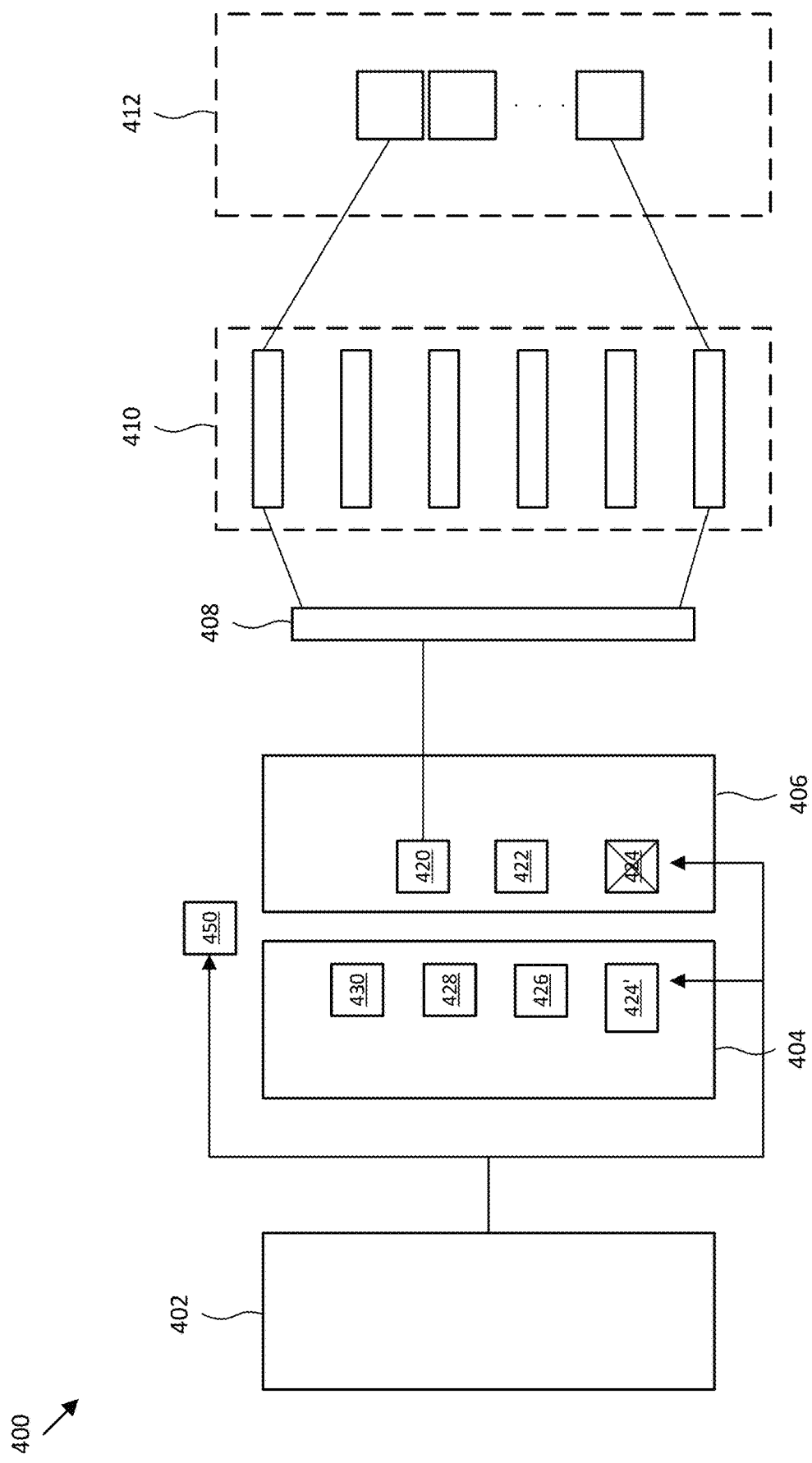
Figure 4C:
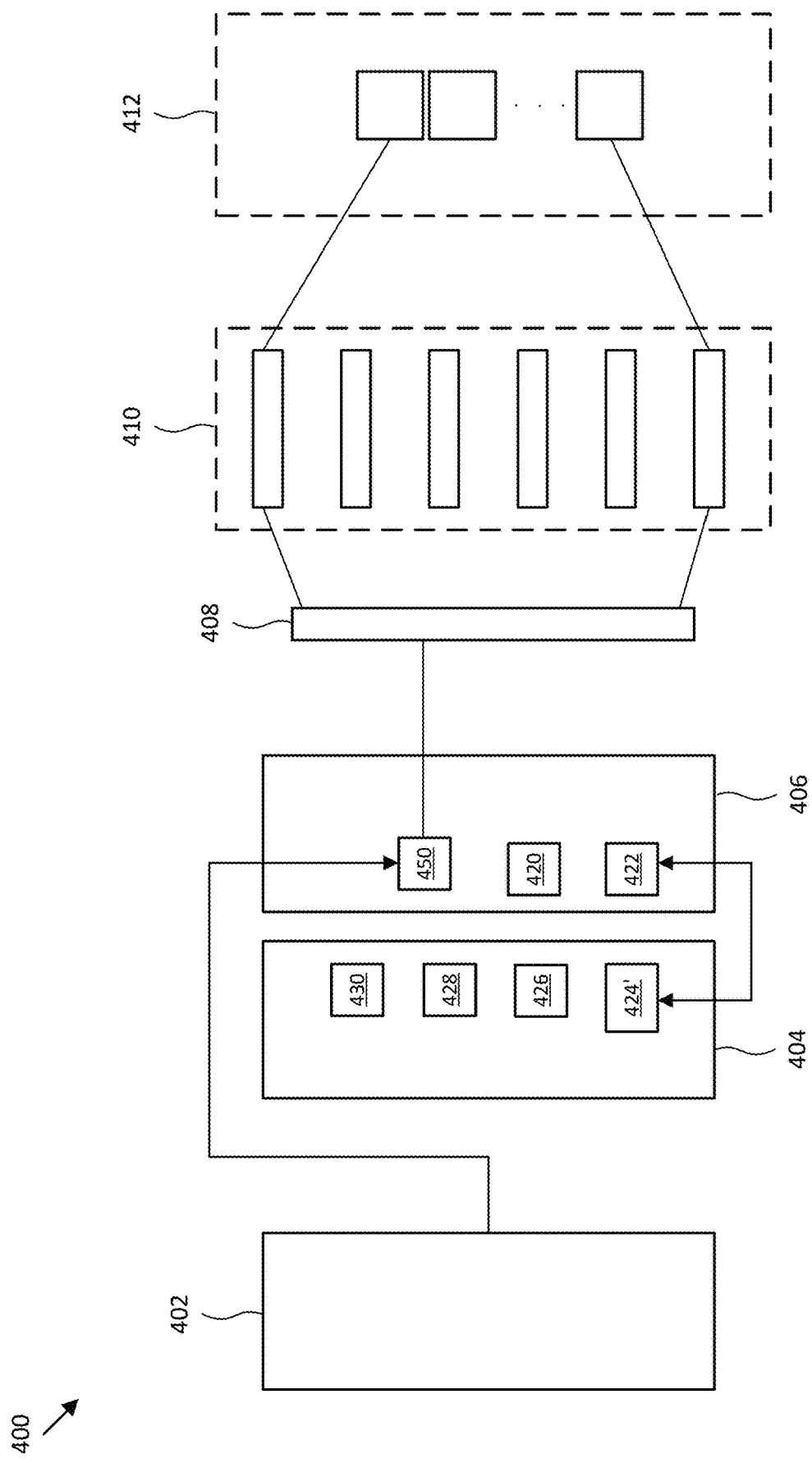

FIGS. 4A-4C illustrate a block diagram of a memory system 400, according to an embodiment. Referring to FIG. 4A, the memory system 400 includes a source 402, a lower tier memory 404, a higher tier memory 406, an arbiter 408, destination queues 410, and destinations 412. Entries 420, 422 and 424 are stored on the higher tier memory 406 and entries 426, 428 and 430 are stored on the lower tier memory 404. The entries are linked, such that entry 420 is to be processed first, then entry 422, then 424, then 426, etc. Prior to processing the entries, the system 400 stores a copy of entry 424, denoted as entry 424'. Therefore, entry 424 employs dual residency on both the higher tier memory 406 and the lower tier memory 404.

A link-list may be utilized to link entries together. Thus, each entry may include a link indicator that indicates in which order/position the entry is to be processed and/or which entry is to be processed next. The link indicator may include a pointer that identifies where the next entry to be processed is located. In the example shown in FIG. 4A, entry 420 may include a link indicator that indicates the entry is to be processed first and/or that entry 422 is to be processed next as well as a pointer to the location of entry 422, entry 422 may include a link indicator that indicates the entry is to be processed after entry 420, and/or that entry 424 is to be processed next as well as a pointer to the location of entry 424, entry 424 may include a link indicator that indicates the entry is to be processed after entry 422 and/or a next entry to be processed next as well as a pointer to the location the next entry, etc. When entry 424' is copied to the lower tier memory 404, it may not include a link indicator or it may include an indicator that indicates the entry is not linked, as entry 424' is not to be processed while entry 424 is still stored on the higher tier memory 406 and is still linked to other entries. Additionally, a pointer of entry 424 may point to entry 424' and a pointer of entry 424' may point to entry 426. Entry 424' may include a marker that indicates the entry is a duplicate copy. When entry 424 is tiered down, the memory system may delete the marker that indicates that entry 424' is a duplicate copy or may change the marker to indicate that entry 424' is no longer a duplicate.

Referring to FIG. 4B, while processing the entries, the memory system 400 receives an entry 450 and determines the entry to be a HOL entry. Therefore, the memory system 400 may create space on the higher tier memory 406 by overwriting entry 424 with entry 450. As shown in FIG. 4C, the HOL entry 450 is processed first, and entry 422 is relinked with entry 424' to maintain the processing sequence. Entry 424' may be relinked by adding a link indicator to the entry 424', indicating that entry 424' is to be processed after entry 422. In some embodiments, the link indicator in entry 426 may be updated to indicate that entry 426 is to be processed after entry 424' instead of entry 424.

Figure 5A:
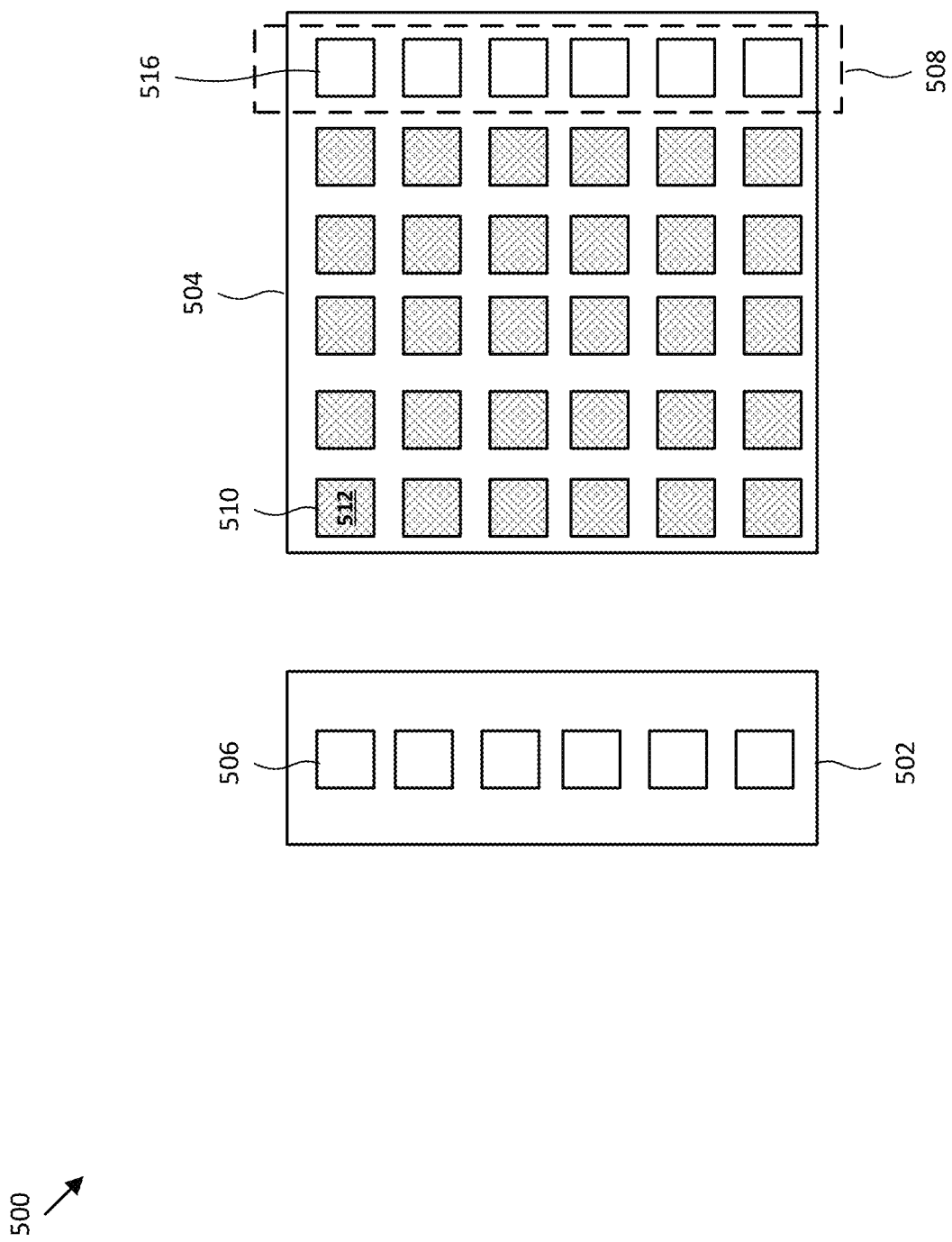
FIGS. 5A, 5B, and 5C illustrate diagrams of a memory storage, according to an embodiment
Figure 5B:
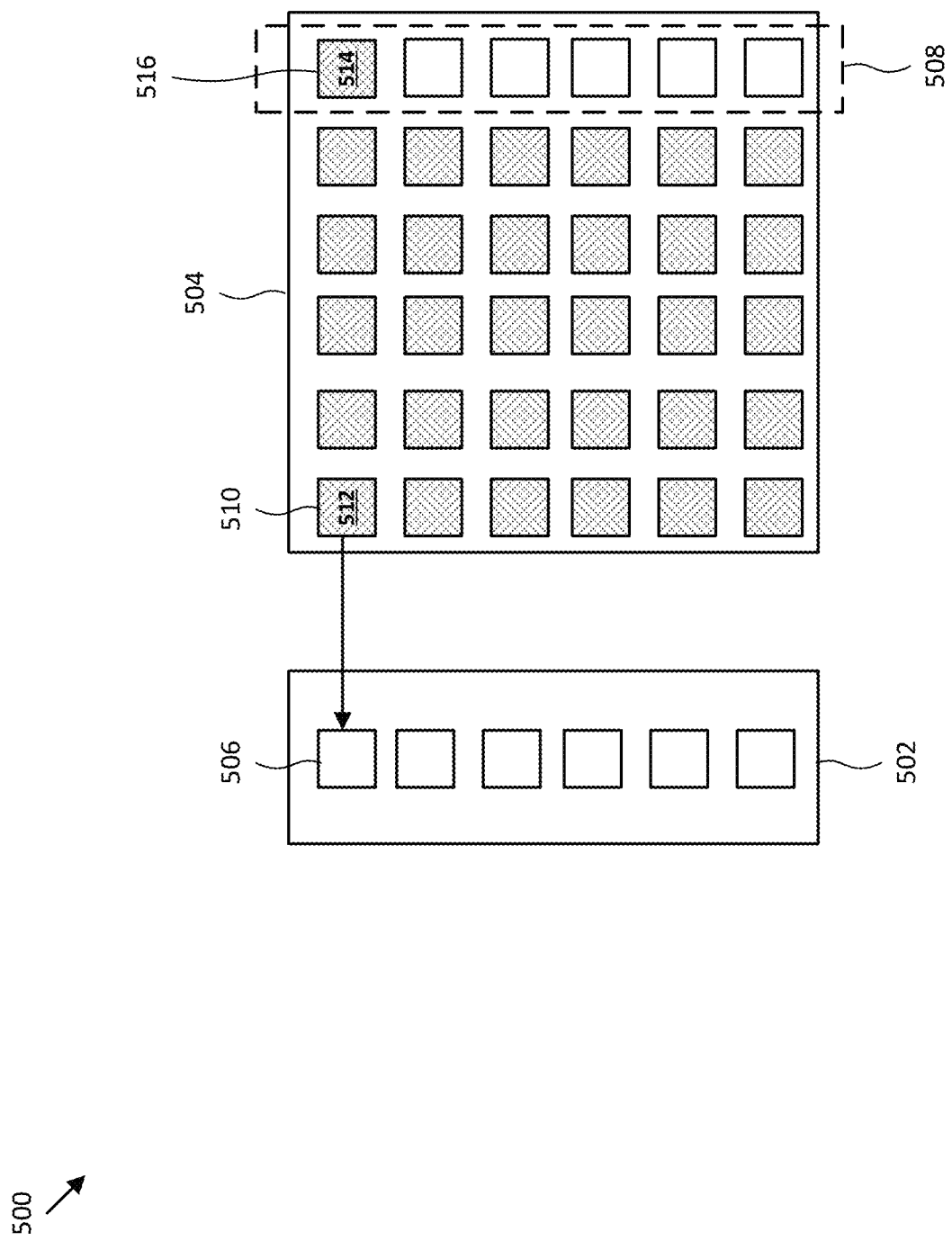
Figure 5C:
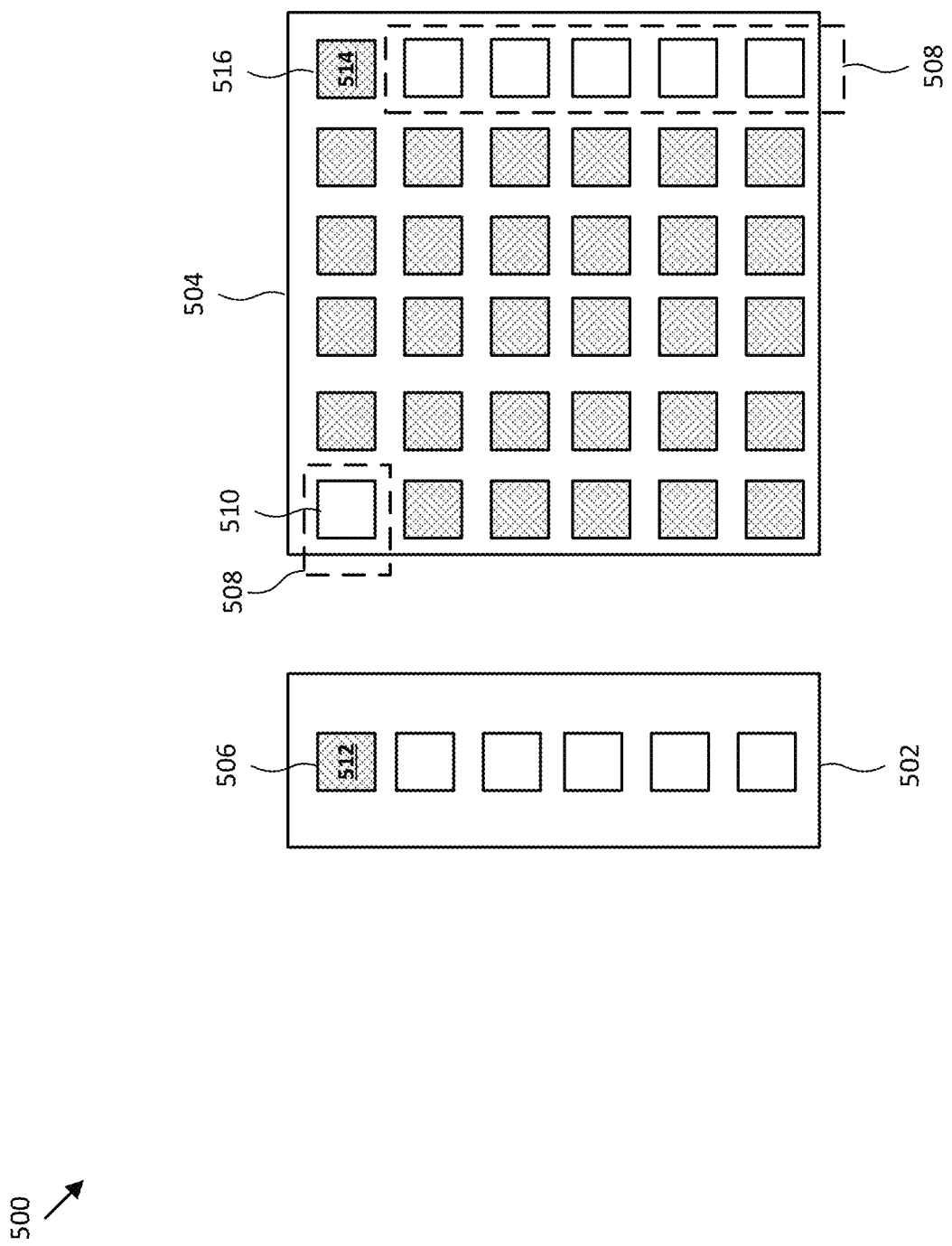

FIGS. 5A-5C illustrate diagrams of a memory storage 500, according to an embodiment. Referring to FIG. 5A, the memory storage 500 may include a lower tier memory 502 and a higher tier memory 504. The lower tier memory 502 may include storage spaces, such as space 506, to store entries. The higher tier memory 504 may include an overprovisioned portion 508 and storage spaces, such as space 510, to store entries, such as entry 512. The spaces in the overprovisioned portion 508 may include an attribute that indicates the spaces are part of the overprovisioned portion 508.

Referring to FIG. 5B, when a new HOL entry 514 is received, the system may store the HOL entry 514 on a space 516 of the overprovisioned portion 508. To maintain the number of spaces for the overprovisioned portion 508 prior to receiving the HOL entry 514, the system may identify an entry, such as entry 512, to move/transition from the higher tier memory 504 to the lower tier memory 502. Entry 512 may be a TOL entry or other type of entry. Referring to FIG. 5C, entry 512 is now stored in space 506 of the lower tier memory 502, and an attribute of space 510 may be updated to indicate that space 510 is allocated as part of the overprovisioned portion 508.

A bitmap of memory may be stored. Each bit in the bitmap may correspond to a space in memory. One value (e.g., 0) of a particular bit may indicate that a corresponding memory position is overprovisioned. A different value (e.g., 1) of another bit may indicate the other bit is a normal (non-overprovisioned) storage space. For example, the bitmap may include a first bit that corresponds to the space 510 and a second bit that corresponds to space 516. In FIG. 5A, space 510 may have a particular value (e.g., 0) indicating that the space is normal memory, and space 516 may have a particular value (e.g., 1) indicating that the space is part of the overprovisioned portion 508. In FIG. 5C, after entry 514 is stored in space 516, the value of space 516 may update (e.g., from 1 to 0), indicating that the space 516 is now part of the normal memory. Furthermore, the value of space 510 may update (e.g., from 0 to 1), indicating that space 510 is now part of the overprovisioned portion 508.

Figure 6:
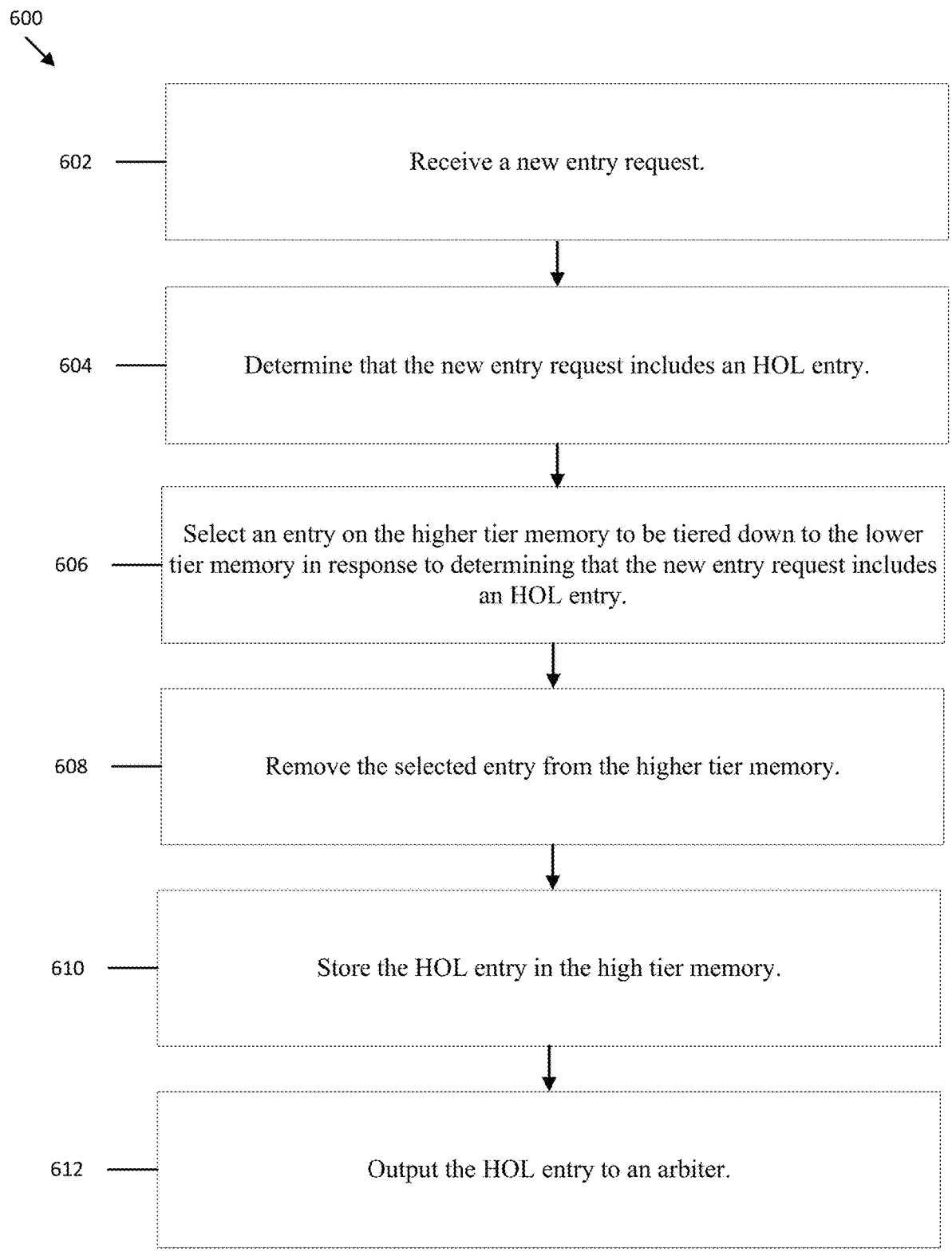
FIG. 6 illustrates a flowchart for a method of a buffer memory device, according to an embodiment.

FIG. 6 illustrates a flowchart 600 for a method of a buffer memory device, according to an embodiment. Any of the components or any combination of the components described (i.e., in the device diagrams) can be used to perform one or more of the operations of the flowchart 600. The operations depicted in the flowchart 600 are example operations and may involve various additional steps not explicitly provided in the flowchart 600. The order of the operations depicted in flowchart 600 is exemplary and not exclusive, as the order may vary depending on the implementation.

At 602, a buffer memory device receives a new entry request. At 604, the memory device determines that the new entry request includes an HOL entry. At 606, the memory device selects an entry on the higher tier memory to be tiered down to the lower tier memory in response to determining that the new entry request includes an HOL entry. At 608, the memory device removes the selected entry from the higher tier memory. At 610, the memory device stores the HOL entry in a higher tier memory. At 612, the memory device outputs the HOL entry to an arbiter.

Figure 7:
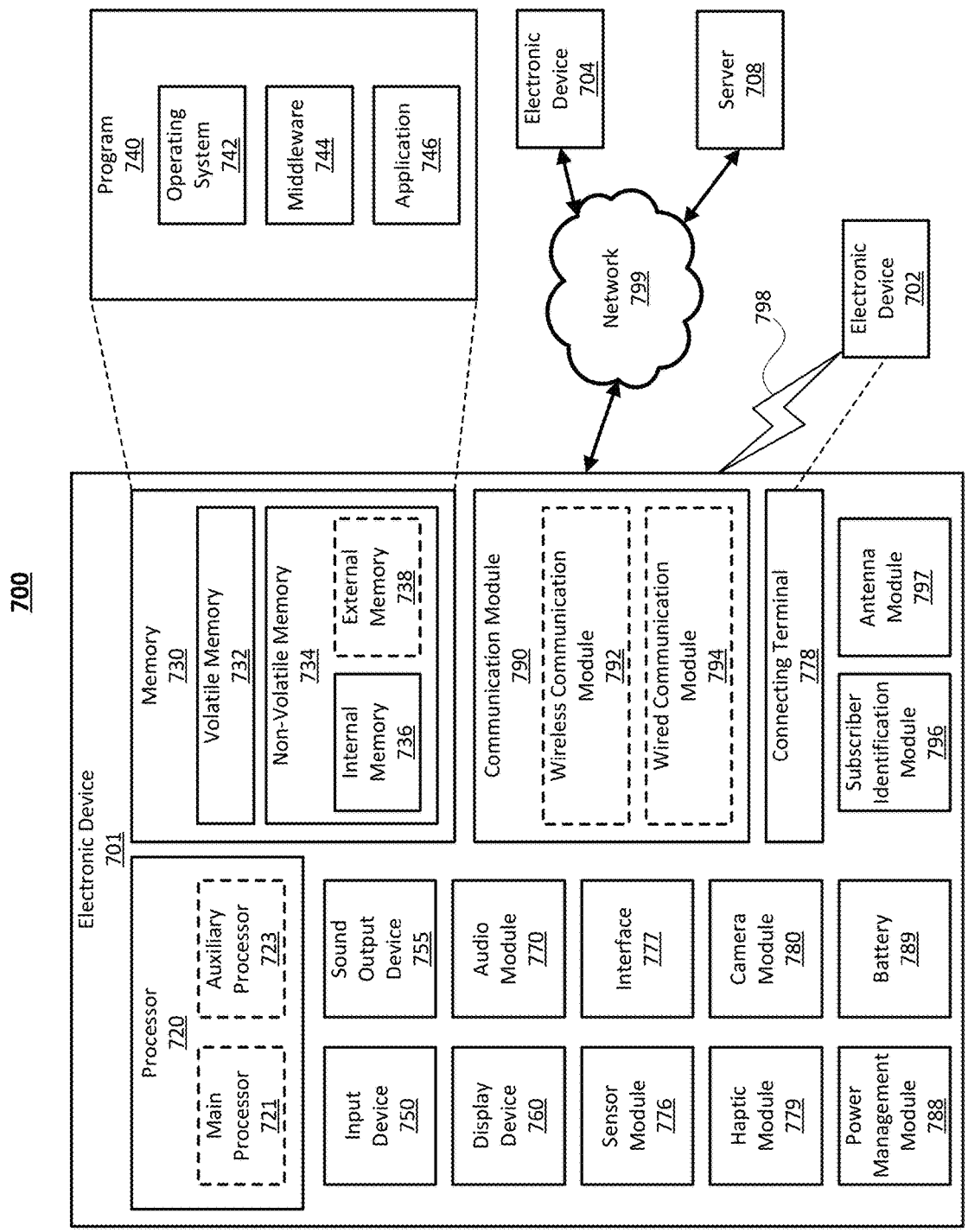
FIG. 7 illustrates a block diagram of an electronic device in a network environment, according to one embodiment.

FIG. 7 illustrates a block diagram of an electronic device 701 in a network environment 700, according to one embodiment. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 8:
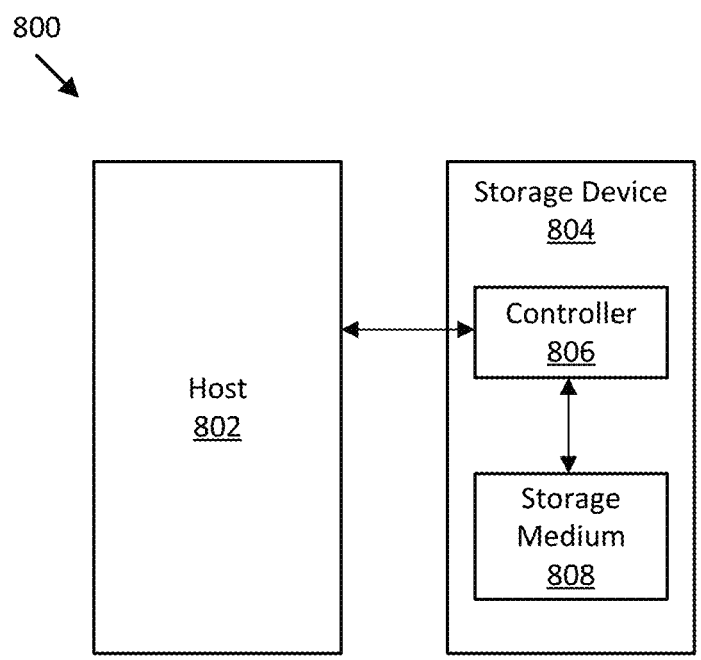
FIG. 8 illustrates a diagram of a storage system, according to an embodiment.

FIG. 8 illustrates a diagram of a storage system 800, according to an embodiment. The storage system 800 includes a host 802 and a storage device 804. Although one host and one storage device is depicted, the storage system 800 may include multiple hosts and/or multiple storage devices. The storage device 804 may be a solid state device (SSD), a universal flash storage (UFS), etc. The storage device 804 includes a controller 806 and a storage medium 808 connected to the controller 806. The controller 806 may be an SSD controller, a UFS controller, etc. The storage medium 808 may include a volatile memory, a non-volatile memory, or both, and may include one or more flash memory chips (or other storage media). The controller 806 may include one or more processors, one or more error correction circuits, one or more field programmable gate arrays (FPGAs), one or more host interfaces, one or more flash bus interfaces, etc., or a combination thereof. The controller 806 may be configured to facilitate transfer of data/commands between the host 802 and the storage medium 808. The host 802 sends data/commands to the storage device 804 to be received by the controller 806 and processed in conjunction with the storage medium 808. As described herein, the methods, processes and algorithms may be implemented on a storage device controller, such as controller 806. The sources and destinations described herein may correspond to elements of the host 802 (i.e., processors or applications) and the storage medium 808. In examples where multiple hosts are utilized, the sources and destinations may correspond to different hosts.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a buffer memory device having a lower tier memory and a higher tier memory, comprising
receiving a new entry request from a source queue;
determining that the new entry request includes a head of line (HOL) entry, wherein the HOL entry is a first entry for a new traffic stream from the source queue;
selecting an entry on the higher tier memory to be tiered down to the lower tier memory in response to determining that the new entry request includes the HOL entry;
moving the selected entry from the higher tier memory to the lower tier memory;
storing the HOL entry in the higher tier memory of the buffer memory device;
outputting the HOL entry from the higher tier memory to a destination arbiter.

2. The method of claim 1, further comprising storing the HOL entry in an allocated overprovisioned portion of the higher tier memory, and storing the HOL entry on a non-overprovisioned portion of the higher tier memory after the selected entry is moved from the higher tier memory to the lower tier memory.

3. The method of claim 1, wherein the higher tier memory includes a static random access memory (SRAM) and the lower tier memory includes a dynamic random access memory (DRAM).

4. The method of claim 1, further comprising advance copying the selected entry to the lower tier memory of the buffer memory device prior to removing the selected entry from the higher tier memory.

5. The method of claim 4, wherein removing the selected entry comprises overwriting the selected entry in the higher tier memory with the HOL entry.

6. The method of claim 1, further comprising storing a copy of the selected entry on the lower tier memory.

7. The method of claim 6, further comprising relinking a tail of line (TOL) entry on the higher tier memory to the copy of the selected entry on the lower tier memory after the selected entry is removed from the higher tier memory.

8. A storage system, comprising:
a memory including a higher tier memory and a lower tier memory; and
a processor configured to:
receive a new entry request from a source queue;
determine that the new entry request includes a head of line (HOL) entry, wherein the HOL entry is a first entry for a new traffic stream from the source queue;
select an entry on the higher tier memory to be tiered down to the lower tier memory in response to determining that the new entry request includes the HOL entry;
move the selected entry from the higher tier memory to the lower tier memory;
store the HOL entry in the higher tier memory; and
output the HOL entry from the higher tier memory to a destination arbiter.

9. The storage system of claim 8, wherein the processor is further configured to store the HOL entry in an allocated overprovisioned portion of the higher tier memory, and store the HOL entry on a non-overprovisioned portion of the higher tier memory after the selected entry is moved from the higher tier memory to the lower tier memory.

10. The storage system of claim 8, wherein the higher tier memory includes a static random access memory (SRAM) and the lower tier memory includes a dynamic random access memory (DRAM).

11. The storage system of claim 8, wherein the processor is configured to advance copy the selected entry to the lower tier memory of the buffer memory device prior to removing the selected entry from the higher tier memory.

12. The storage system of claim 11, wherein the processor is configured to remove the selected entry by overwriting the selected entry in the higher tier memory with the HOL entry.

13. The storage system of claim 8, wherein the processor is further configured to store a copy of the selected entry on the lower tier memory.

14. The storage system of claim 13, wherein the processor is further configured to relink a tail of line (TOL) entry on the higher tier memory to the copy of the selected entry on the lower tier memory after the selected entry is removed from the higher tier memory.

15. A buffer memory device, comprising:
a higher tier memory;
a lower tier memory; and
a destination arbiter,
wherein the buffer memory device:
receives a new entry request from a source queue;
determines that the new entry request includes a head of line (HOL) entry, wherein the HOL entry is a first entry for a new traffic stream from the source queue;

selects an entry on the higher tier memory to be tiered down to the lower tier memory in response to determining that the new entry request includes the HOL entry;
moves the selected entry from the higher tier memory to the lower tier memory;
stores the HOL entry in the higher tier memory; and
outputs the HOL entry from the higher tier memory to the destination arbiter.

16. The buffer memory device of claim 15, wherein the buffer memory device further stores the HOL entry in an allocated overprovisioned portion of the higher tier memory, and stores the HOL entry on a non-overprovisioned portion of the higher tier memory after the selected entry is moved from the higher tier memory to the lower tier memory.

17. The buffer memory device of claim 15, wherein the higher tier memory includes a static random access memory (SRAM) and the lower tier memory includes a dynamic random access memory (DRAM).

18. The buffer memory device of claim 15, wherein the buffer memory device further advance copies the selected entry to the lower tier memory of the buffer memory device prior to removing the selected entry from the higher tier memory.

19. The buffer memory device of claim 18, wherein the buffer memory device further removes the selected entry by overwriting the selected entry in the higher tier memory with the HOL entry.

20. The buffer memory device of claim 15, wherein the buffer memory device further stores a copy of the selected entry on the lower tier memory.

* * * * *